H. Dunham Jr.
Sewing Mach.

No. 3386. Reissued Apr. 20. 1860

Witnesses.
W. B. Deming
Wm. H. Breaton Jr.

Inventor
F. W. Cauuth & E. P. Richardson
by Knight Bros. attorneys.

THE NORRIS PETERS CO., WASHINGTON, D. C.

H. Dunham Jr.

Sewing Mach.

Reissued Apr. 20. 1869.

No. 3386

Witnesses.

W. B. Dennis

Wm. H. Breeton Jr.

Inventor

F. W. Cornish & C. P. Richardson by Knight Bros Attorneys.

THE NORRIS PETERS CO., WASHINGTON, D. C.

Sheet 3 - 3 Sheets

H. Dunham Jr.
Sewing Mach

Reissued Apr. 20. 1869.

No. 3386

Witnesses.

W. D. Dewing
Wm. H. Breton Jr.

Inventor.

F. W. Cornish & E. P. Richardson
by Keuffel Bros Attorneys

THE NORRIS PETERS CO., WASHINGTON, D. C.

UNITED STATES PATENT OFFICE.

FRANCIS W. CARRUTH, OF BOSTON, AND EVERETT P. RICHARDSON, OF LAWRENCE, MASSACHUSETTS, ASSIGNEES, BY MESNE ASSIGNMENTS, OF HENRY DUNHAM, JR.

IMPROVEMENT IN MACHINE FOR SEWING BOOTS AND SHOES.

Specification forming part of Letters Patent No. 36,296, dated September 9, 1862; reissue No. 1,363, dated December 16, 1862; reissue No. 3,386, dated April 20, 1869.

*To all whom it may concern:*

Be it known that HENRY DUNHAM, Jr., of Abington, Massachusetts, invented certain Improvements in Machinery for Sewing Boots and Shoes; and we, FRANCIS W. CARRUTH, of Boston, and EVERETT P. RICHARDSON, of Lawrence, both in the State of Massachusetts, assignees of the entire interest in the said DUNHAM'S invention, hereby declare that the following is a sufficiently full and exact description of the same to enable one skilled in the art to which it appertains to carry it into effect, reference being had to the accompanying drawings, which are made a part of this specification.

In this machine, the shoe to be sewed is mounted upon a last of peculiar construction, secured to a last-holder, through which the feed-movement is communicated to the work, and which is so combined with the sewing-mechanism that the distance between them may be varied to suit irregularities in the work. The invention further relates to mechanism for guiding the work, governing the entrance and exit of the needle, and holding the margin of the upper against and around the edge of the sole at the time of sewing. Also, in an improved manner of applying and operating a cast-off, or needle-closer, in connection with the needle.

Figure 2:
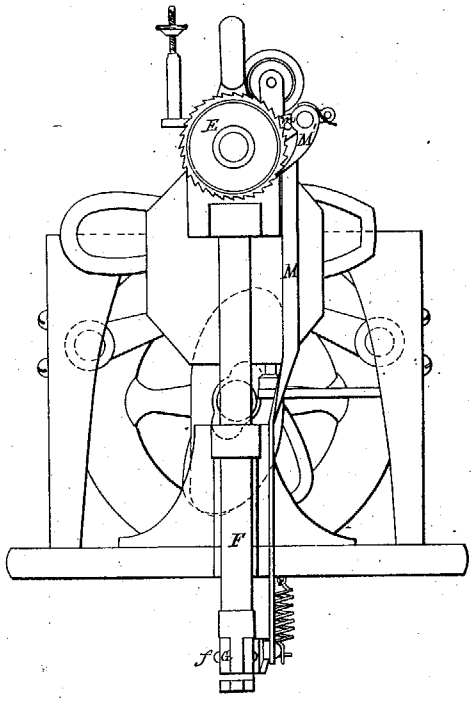
Figure 1:
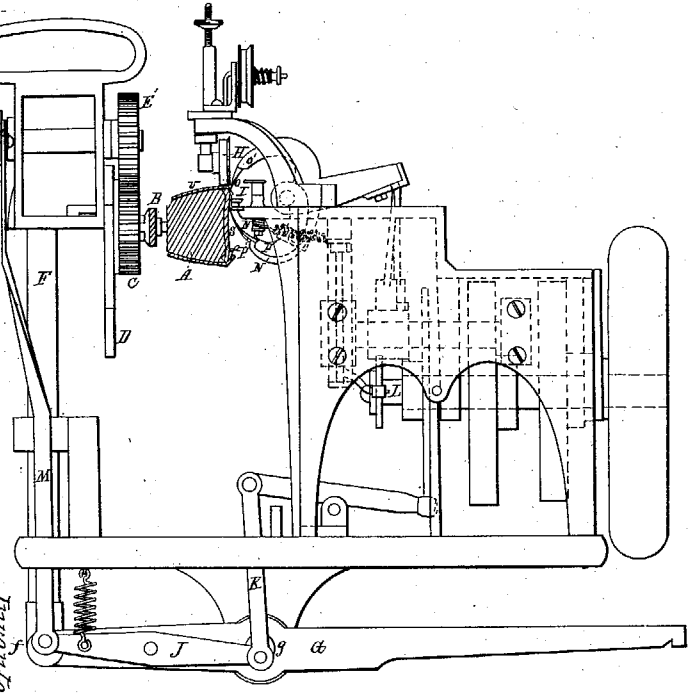
Figure 4:
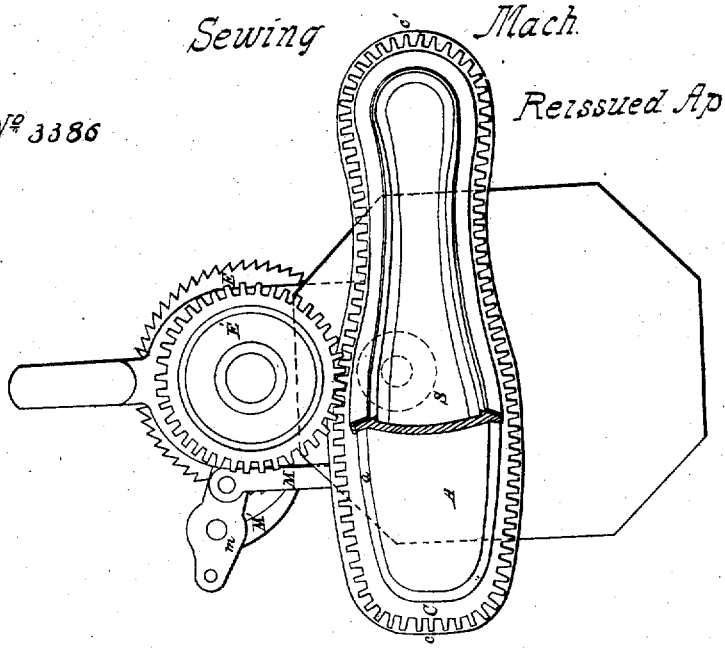
Figure 3:
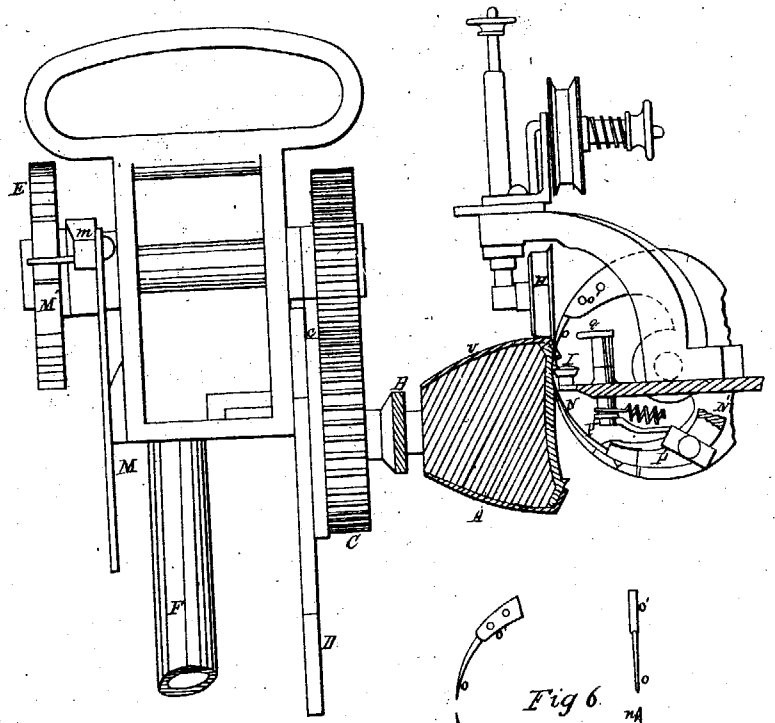
Figure 6:
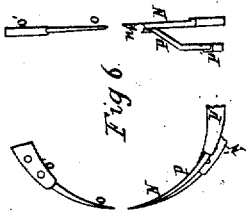
Figure 5:
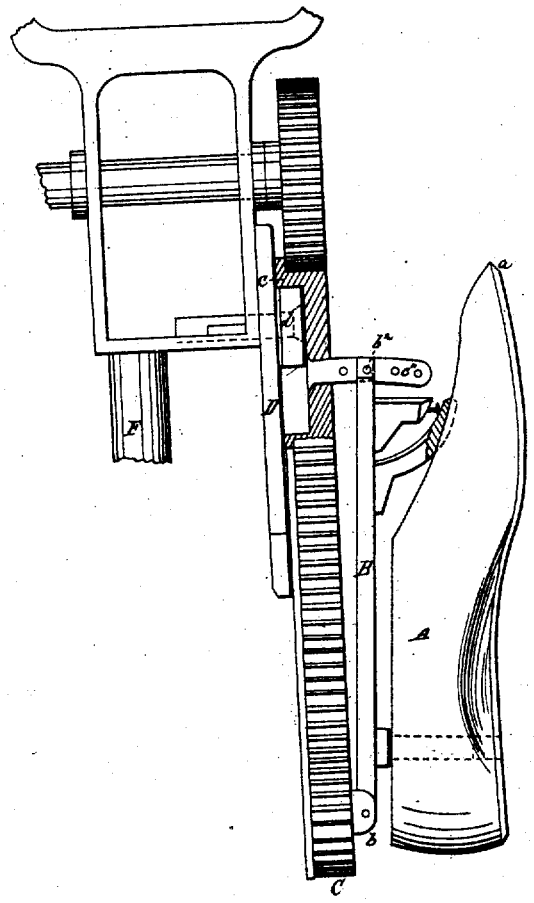

In the drawings, Figure 1 is a side elevation of the machine, with the last and last-holder in section. Fig. 2 is a rear view. Fig. 3 is a side elevation on a larger scale of the principal operating-parts, representing the last and last-holder in section. Fig. 4 is a front view of the last, last-carrier, supporting-plate, and feed mechanism, hereinafter described. Fig. 5 is a side elevation, partly in section, of the last, last-holder, and the carrying and supporting-plates, and their connections, representing the moving-parts, in the position assumed while sewing around the toe. Fig. 6 is a diagram, showing, in side and front elevation, the curved awl, needle, and cast-off, in their relative positions.

In sewing "turned" shoes, the work is applied to a last, A, which is preferably formed with a concave bottom, and is so chamfered, or beveled, near its periphery, as to form around the margin of the bottom a defined ridge, *a*, around which the margin of the sole is pressed and held in the act of sewing, in proper position to receive the margin of the upper which is to be sewed thereto. The last is mounted upon a last-holder, B, hinged at *b* to a carrying-plate, C, which is sustained in proper position by a supporting-plate, D, against the face of which it turns, and by a wheel, or roller, *d*, upon the said supporting-plate, engaging with a flange, *c*, on the movable last-carrying plate C. The carrying-plate C is employed to communicate the feed-movement to the work. For this purpose, its periphery is made of a form approximating to that of the last, and is provided with cogs $c^1$, acted upon by a pinion, E′, upon the shaft of which is mounted a ratchet-wheel, E. The free end of the hinged last-holder B works over a stud, $c^2$, projecting horizontally from the plate C, and perforated with a number of holes, in either of which a pin, $b^2$, may be placed, for the purpose of setting the toe of the last in or out, in relation to the heel.

The parts above described are mounted upon a standard, F, hinged at *f* to a lever, G, which is fulcrumed at *g* to the stationary frame of the machine. The hinge *f* allows horizontal play to the standard F, in order that the distance of the last-holder from the sewing mechanism may be varied, as irregularities in the work, or other circumstances, may render necessary. By the vertical play of the supporting-lever G, the work may be constantly held up to the sewing mechanism. The bearing against which the work is thus held for sewing, is preferably constructed in the form of a flanged wheel, H, the pressing-surface of which is adapted to hold the edge of the upper U firmly and snugly around the edge of the sole S, as represented in Fig. 3.

The guiding of the work is effected (in conjunction with the mechanism already described,) by a wheel, or plate I, working in the customary channel of the sole, and serving also to open the said channel preparatory to sewing. The two guides H I serve not only to determine the correct position of the work, but to govern the points of entrance and exit of the needle, and the distance of the stitching from the sole. The intermittent feed-movement is communicated through a short lever, J, fulcrumed upon the lever G, and so proportioned and applied that it will operate with great effect in all positions of the lever G. To one end of the lever J is attached a rod, K, actuated by the cam-shaft L, and to the other a rod, M, which is pivoted to a lever, *m*, carrying a pawl, M′, which actuates the ratchet-wheel E.

The sewing is effected by a curved hooked needle, N, mounted in a curved lever, N′. This needle is so constructed and applied that its outer surface will be concentric, or nearly so, with the centre of motion, and has an elliptical form in its transverse section, to adapt it to produce or pass through a hole, which is elongated in a direction parallel with the edge of the sole.

The preliminary punching of the work may be effected by an awl, O, having a curvature concentric with and similar to that of the needle N, and so flattened as to produce an elongated hole, in the manner already explained. O′ represents the curved lever, to which the awl is attached. The hook *n* is formed upon the side or flank of the needle N, rather than upon its curved front or back. Hence its projection is lengthwise of the elliptical hole produced by the awl or needle, and any lateral or radial straining of the leather is avoided. The hooked needle N, while projecting through the work, takes the thread from a vibrating thread-carrier, Q, of common form, and draws the loop down through the work, and through the loop previously formed, which rests upon a needle-closer, or cast-off P, so as to prevent the needle-hook catching the old loop a second time. The needle-closer is carried by a lever, P′, which vibrates on the same centre as the levers N′ and O′. The needle-hook, as soon as it is withdrawn from the sole, is closed by the said cast-off, which then moves with the needle in its descent, and again rises with it, until the needle is about to re-enter the work, at which time the cast-off or needle-closer P rests on the outside of the work. The loop last formed, as it leaves the cavity of the hook, is caught by the needle-closer, and retained until the needle, having passed up through the work, draws a new loop down through it in the manner already explained.

The movements of the needle, needle-closer, and awl, may be effected by suitable cam mechanism, which it is within the knowledge of a skilled mechanic to construct and arrange, so as to produce the effects desired. They therefore require no specific description here.

The following is what we claim as new in the invention of the said HENRY DUNHAM, Jr.:

1. We claim the last-holder B, and supporting-plate D, when so combined with a sewing mechanism that their distance from the said sewing mechanism can be varied to suit irregularities in the work.

2. In combination with a last-carrier, supported substantially as described, so that its distance from the sewing mechanism may be varied, we claim a feed-movement, acting through the said last-carrier, as set forth.

3. In combination with a mechanism for sewing boots and shoes, we claim the last A, having a concave bottom, substantially as described.

4. In combination with a mechanism for sewing boots and shoes, we claim a last, having the edge *a* chamfered so as to form a defined ridge or angle on the bottom thereof, as and for the purpose described.

5. We claim the guide or bearing H, when constructed with two bearing faces or surfaces, against which the work may be pressed, so that the upper will be bent or held around the edge of the sole, substantially as described.

6. We claim the combination of the guides or gages H and I, bearing against the same side or face of the work, for the purpose of regulating the entrance and exit of the needle, or other piercing instrument, and the distance of the stitches from the edge of the sole.

7. We claim the curved needle N, when constructed with a hook upon its side or flank, substantially as described.

8. We claim the combination of the curved needle N and the cast-off P, constructed and operating substantially as and for the purposes stated.

9. We claim the combination of the curved awl O and curved hooked needle N, substantially as described.

FRANCIS W. CARRUTH.
EVERETT P. RICHARDSON.

Witnesses to FRANCIS W. CARRUTH:
CHARLES T. CARRIT,
GEO. C. BARRETT.
Witnesses to EVERETT P. RICHARDSON:
WM. H. BRERETON, Jr.,
JOHN GRINNELL.